April 7, 1964
H. W. MOORE
3,127,662
WEDGE INSERTING MACHINE
Filed Oct. 14, 1960
3 Sheets-Sheet 2
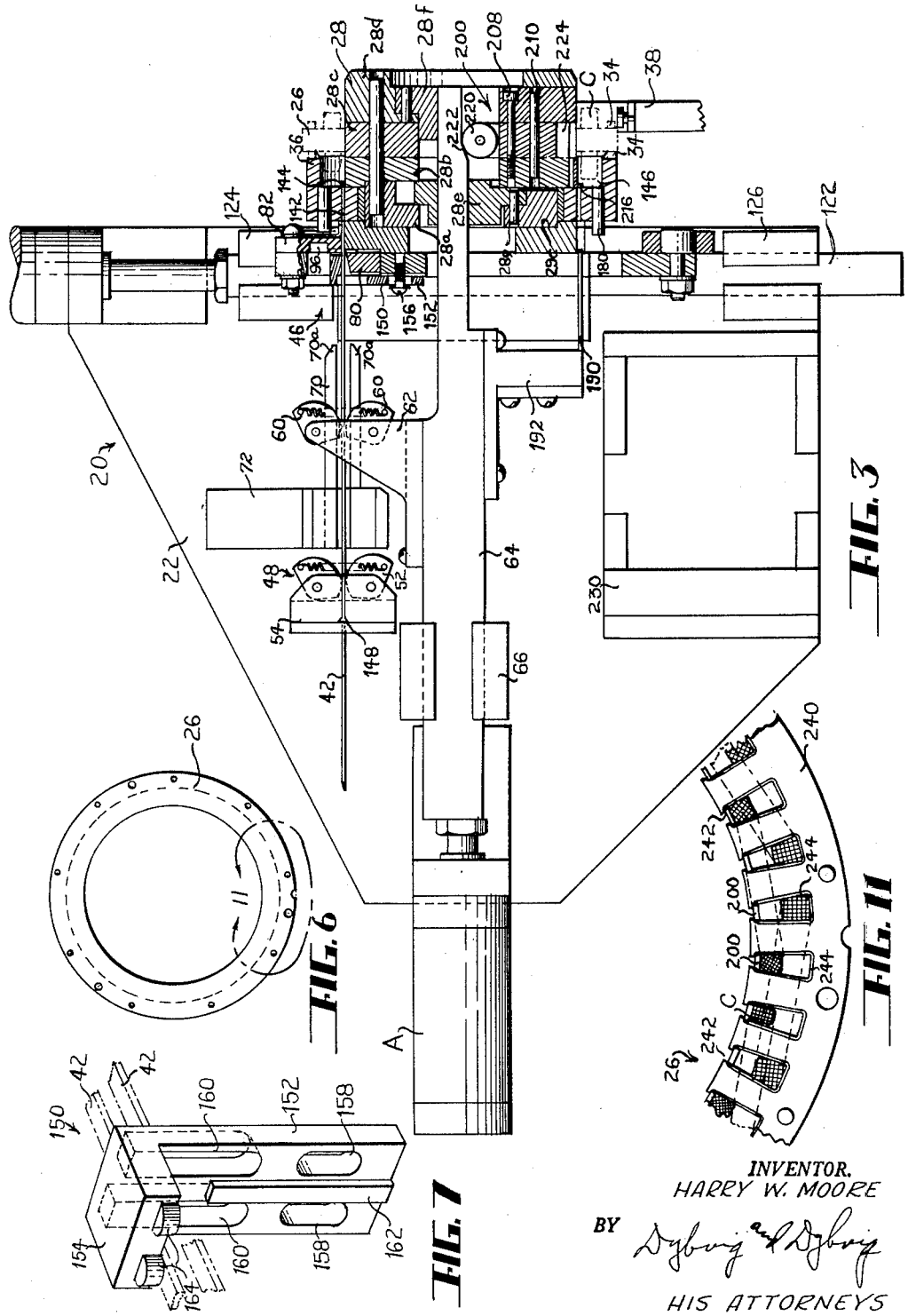
INVENTOR.
HARRY W. MOORE
BY
Dybvig and Dybvig
HIS ATTORNEYS April 7, 1964  H. W. MOORE  3,127,662
WEDGE INSERTING MACHINE
Filed Oct. 14, 1960  3 Sheets-Sheet 3
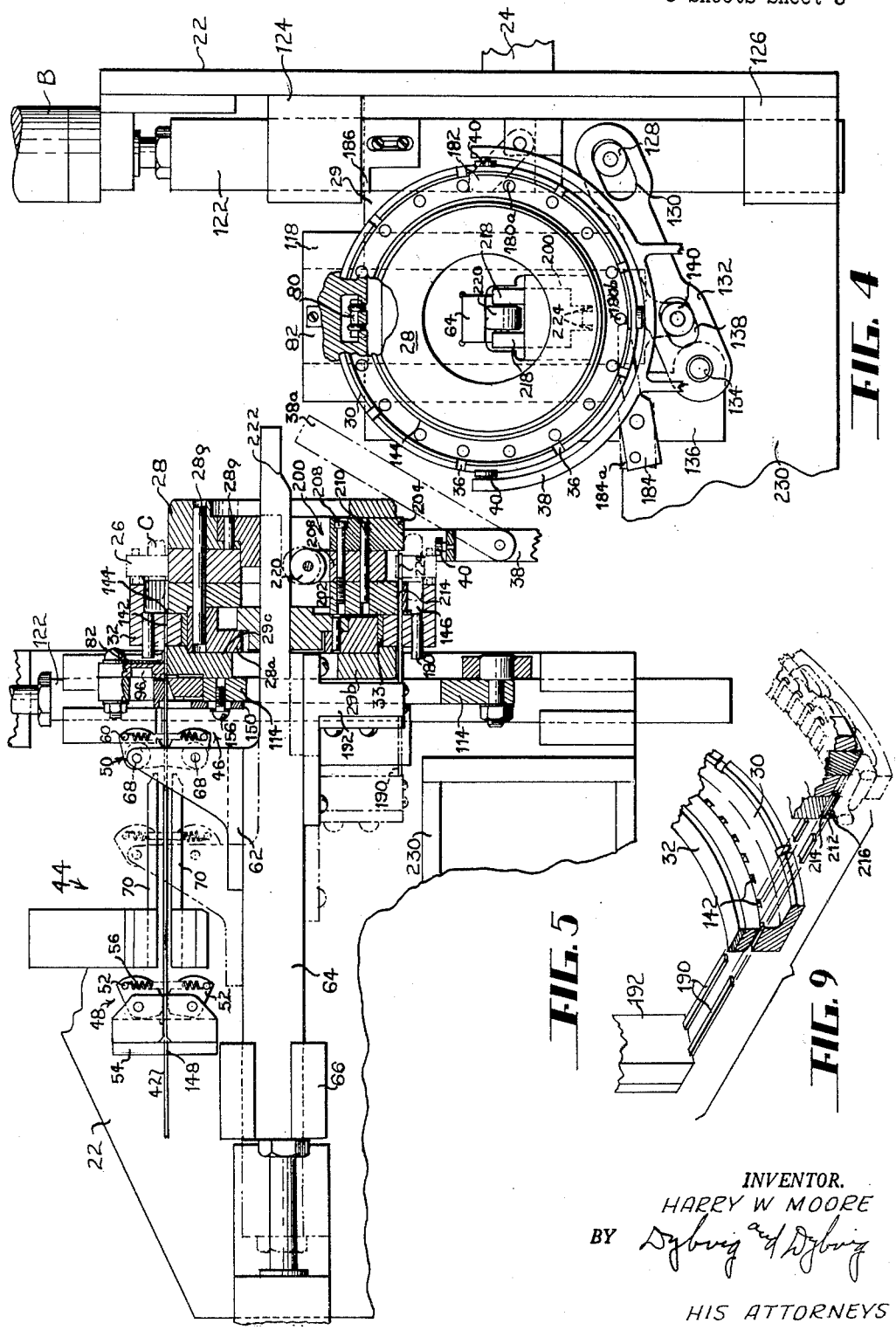
INVENTOR.
HARRY W MOORE
BY Dybvig and Dybvig
HIS ATTORNEYS

United States Patent Office 3,127,662
Patented Apr. 7, 1964

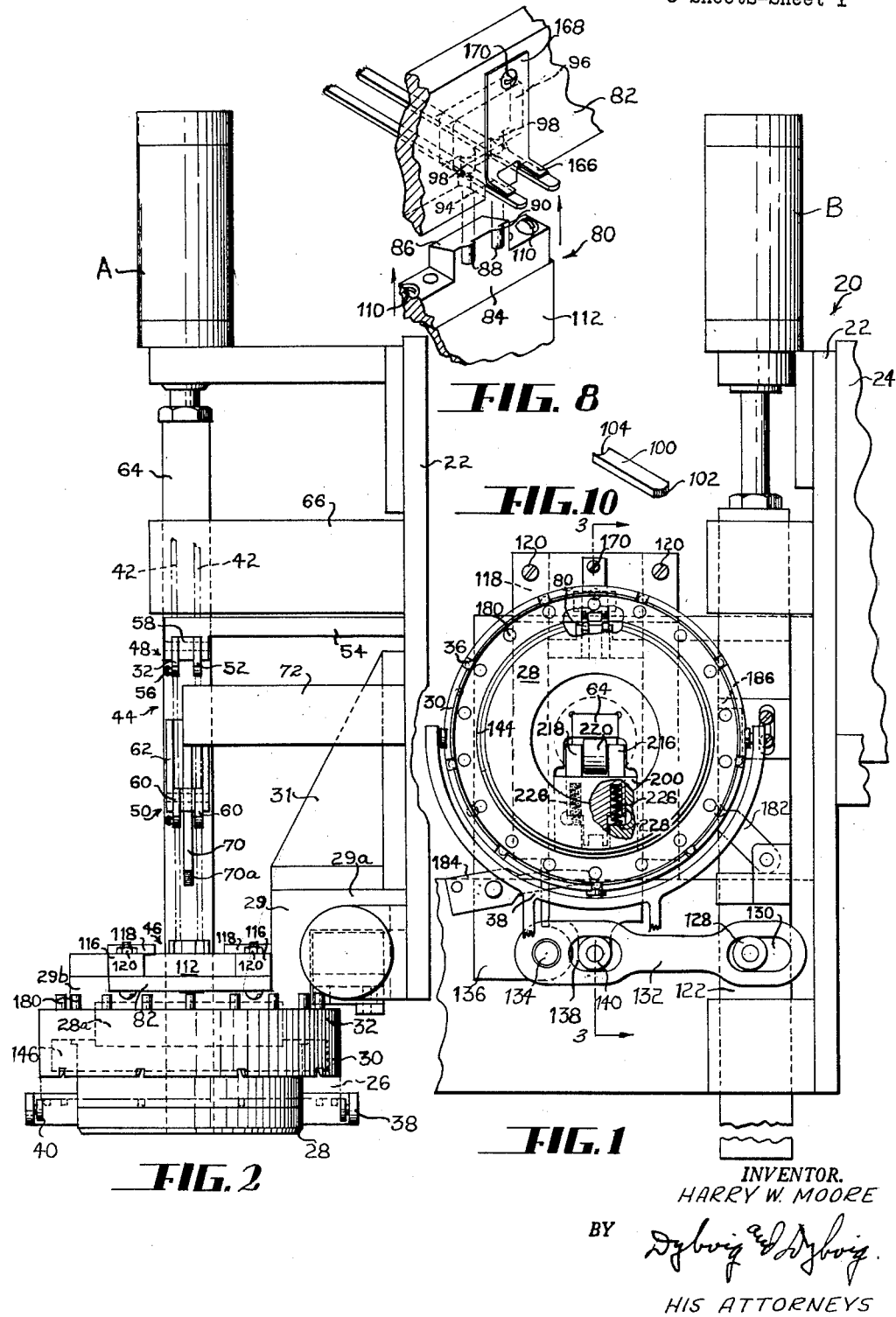

3,127,662
WEDGE INSERTING MACHINE
Harry W. Moore, 5051 Kittridge Road,
Dayton, Ohio
Filed Oct. 14, 1960, Ser. No. 62,590
9 Claims. (Cl. 29—33)

This invention relates to an apparatus for inserting insulating coil retaining wedges into field members of dynamoelectric devices. More particularly, this invention relates to a mechanism for inserting such wedges into the inwardly directed slots provided in an annular stator which is to be used in a motor, generator or accumulator, but is not necessarily so limited.

In the process of providing completed field members having inwardly directed coil-receiving slots, it is necessary to provide wedges in the slots on top of the field carrying coils. The wedges serve a two-fold purpose. They insulate the coils from the frame of the field member and retain the coils within the slots so that they do not slip out or unravel.

The number of slots provided in a stator or the like depends on the particular design of the dynamoelectric member and will vary, for example, as the number of poles or phases varies. Usually the number of slots is an even number and is in the order of 24 to 36. When stators are produced in large quantities, it is impractical to insert the wedges manually and it is desirable to provide a device for automatically inserting wedges into the stator slots.

Accordingly, an object of this invention is to provide an improved mechanism for automatically inserting wedges into the coil-receiving slots of a field member. The mechanism made in accordance with this invention is comparatively simple in operation in that only two actuating members are required to insert the wedges into the slots. As will later be made apparent, each of the actuating members perform a plurality of functions.

The wedges inserted into the field slots may be made of paper or fibrous embedded plastic materials which are easily damaged. Since the coils deposited in the slots normally occupy substantially the entire area of the slots, considerable difficulty has been experienced when inserting wedges into the slots without damage.

Therefore, a further object of this invention is to provide an automatically operable mechanism for rapidly inserting insulating wedges into dynamoelectric field members without damage to the wedges or the field members. The wedges are initially part of a continuous strip. The automatic mechanism moves the strip to a cutter to cut wedges of the desired size to fit within the slots provided in the field member and then moves the wedges from the cutter to the slots in the field member.

A more specific object of this invention is to provide mechanism for inserting wedges into radial inwardly directed slots in annular field members including apparatus for pressing the coils adjacent the slots radially outwardly. Thereby, the wedges may be inserted into the edges of the slots without interference from the coils and thus without damage to either the coils or the wedges.

Other objects and advantages reside in the construction of parts, the combination thereof, the method of manufacture and the mode of operation, as will become more apparent from the following description.

FIGURE 1 is a front elevational view, with portions broken away, of an automatically operable wedge inserting mechanism made in accordance with this invention.

FIGURE 2 is a top view of the mechanism.

FIGURE 3 is a side elevational view of the mechanism, with portions shown in section along lines 3—3 of FIGURE 1.

FIGURE 4 is a view similar to FIGURE 1 during one stage of operation of the mechanism.

FIGURE 5 is a view similar to FIGURE 3 during another stage of the operation of the mechanism.

FIGURE 6 is an elevational view of a field member which may be provided with wedges by the mechanism of this invention.

FIGURES 7 and 8 are enlarged perspective views of portions of an assembly used to sever a strip of wedge material into wedges.

FIGURE 9 is a partial exploded view of the parts used in inserting the wedges directly into the coil-receiving slots of the field member.

FIGURE 10 is a perspective view of a single wedge which is to be inserted into one of the coil-receiving slots.

FIGURE 11 is a partial view, taken along arcuate line 11 of FIGURE 6, of a portion of a field member which has been provided with coils and wedges.

An automatic mechanism for inserting wedges into field members is indicated generally in FIGURES 1 and 2 by the reference character 20. The entire mechanism 20 is supported on a mounting plate or bracket 22 which is held in a vertical position on top of support members indicated diagrammatically at 24. While the mounting plate 22 is shown as being vertical, it will become apparent from the following description that the vertical orientation is arbitrary and that the mounting plate 22 could lie in a different plane.

A single stator or other field member, designated 26, to be provided with wedges is mounted upon a cylindrical stator supporting head 28 which in turn is supported by a mounting bracket 29 upon the plate 22. As shown in FIGURE 2, the bracket 29 is generally Z-shaped, one leg 29a being welded or otherwise affixed to the plate 22, and buttressed by a bracket 31. The other leg of the bracket, designated 29b, may be recessed, as shown at 29c in FIGURES 3 and 5, to receive a rearwardly extending hub 28a which forms a part of the head 28. The hub 28a may be press fit within the recess 29c and affixed to the bracket leg 29b in any suitable fashion, as by bolts (not shown). Thus, the head 28 is fixedly mounted with respect to the plate 22. Aside from the hub 28a, the head 28 is comprised of a plurality of approximately ring-shaped plates 28b, 28c and 28d and a pair of collar members 28e and 28f. The plates 28b, 28c and 28d are each provided with a cutout portion to form a guide channel for a pressure member as will be described hereinafter. But for the difficulties and expense involved in manufacture, the head 28 could be made from a single piece of metal. Since made from the plurality of elements 28a through 28f, a plurality of dowel pins 28g are required to retain the various portions of the head member as a unit.

As indicated by the phantom lines 26 in FIGURES 2, 3 and 5, one side of the field member 26 to be provided with wedges in accordance with this invention is placed in mating contact with an annular flange 30 which is integral with a rotatable annular ring-shaped wedge magazine 32. The magazine 32 is rotatably mounted on the hub portion 28a from which it is separated by an annular bearing 33, and is sandwiched between the bracket portion 29b and the head portion 28b. The sides of the field member have a plurality of circumferentially spaced pins 34 engageable within a like number of recesses 36 in the flange 30, whereby the relative circumferential position of the member 26 and the flange 30 is held constant. A semi-circular yoke or clamp 38 having a plurality of rotatably mounted rollers 40 engageable with the forward side of the field member 26 retains the field member in engagement with the flange 30. The yoke 38 is supported on a suitable bracket (not shown) and is biased by means of a spring or lever mechanism (not shown) so as to occupy the position shown in FIGURES 1 through 4. After one field member is provided with wedges, as will be described hereinafter, the yoke 38 may be swung out of clamping position as indicated at 38a (FIGURE 5), the field member removed and another inserted on the head 28.

A pair of wedge supply reels (not shown) are mounted behind the mechanism 20. Referring to FIGURES 2, 3 and 5, a strip 42 of wedge material is coursed from each supply reel through a wedge strip feed apparatus or supply assembly 44 into a cutter assembly 46 located at the upper rear of the head 28. The feed assembly 44 comprises a pair of fixed one-way brakes 48 and a pair of movable one-way clutches 50, there being one brake 48 and one movable clutch 50 associated with each strip 42. Each fixed brake 48 comprises a pair of clamping jaws 52, each of which is pivotally mounted upon a supporting bracket 54 attached to the plate 22. The jaws 52 are so mounted as to engage the associated strip 42 on opposite sides thereof, the pivot points for the jaws being equally spaced from the strip 42. Each of the jaws 52 has an arcuate clamping surface having a constantly varying radius. The smallest radius is less than one-half the distance between the pivot points for the cooperating jaws forming each brake 48 while the largest radius is considerably greater than one-half the same distance. A spring 56 biases the portion of the jaws having the greatest radius together, whereby the jaws tightly engage the strip 42. It is apparent, however, that the strips 42 may be moved forwardly, that is to the right as viewed in FIGURES 3 and 5, whereby the friction between the strips and the jaws tends to overcome the bias of the spring 56. However, rearward movement of the strips 42 is prevented by the jaws 52, since the friction then would add to the bias of the spring 56, thus causing the jaws to more tightly engage the strips. As shown in FIGURE 2, the upper pair of jaws 52 for the two brakes 48 are interconnected by a sleeve 58. The lower jaws 52 are similarly interconnected. Accordingly, only one spring 56 is required for both brakes 48.

The movable clutches 50 are similar in construction to the fixed brakes 48. In this case, however, a pair of jaw assemblies 60 are mounted on a support block 62 which in turn is affixed to the top of an elongate longitudinally extending ram 64. The ram 64 is reciprocated by a first actuator "A" and guided by means of a channel member 66 and the collars 28e and 28f along the axis of the supporting head 28. The top and bottom jaws respectively are connected by eccentric sleeves 68. A pair of parallel, longitudinally extending clutch release members 70 are located immediately between the sleeves 68, but still on opposite sides of the strips 42. The release members 70 are supported by a post 72 mounted on the plate 22. The forward portion 70a of each release member 70 slopes forwardly and toward the strips 42.

The operation of the feed assembly 44 is as follows. Initially, the parts occupy the position shown in FIGURE 3. The actuator "A" is energized to move the ram 64 forwardly, that is to the right. At the start of this movement, the jaws 60 forming the clutches 50 are held from engagement with the strips 42 since the eccentric sleeves 68, as shown in the dotted line position in FIGURE 5, are engaged with the opposed, parallel outer surfaces of the release members 70. However, upon continued forward movement, the sleeves are permitted to rotate along the sloping ends 70a, whereby the jaws 60 tightly clamp the strips 42. Upon further forward movement of the ram 64, the jaws 60 pull the strips 42 forwardly. The forward movement of the ram is then terminated, whereby the parts occupy the position shown in FIGURE 5. The strips are thus fed to the cutter assembly 46 and, as will be more fully described below, a pair of wedges are forced into the magazine 32. The actuator "A" then returns the ram 64 rearwardly. Although the clutches 50 are engaged with the strips 42 upon initial rearward movement of the ram, the strips 42 do not move rearwardly because of the one-way brake 48 as described above. Additionally, after a small amount of rearward movement, the eccentric sleeves 68 are engaged by the clutch release member 70, whereupon the jaws are pivoted out of engagement with the strips. Thus, each time the ram 64 is reciprocated by the actuator "A," the strips 42 are advanced by small increments toward the cutter assembly 46.

The cutter assembly 46 includes a movable cutter 80 and a stationary cutter 82. These are shown in section in FIGURES 2 and 4 but are shown more clearly in perspective view in FIGURE 8. Also, portions of FIGURES 1 and 4 are cut away to further disclose the operation of the cutter assembly. The movable cutter 80 includes a central upright cutter head 84 having a sloping upper surface 86 terminating in a pair of semicylindrical bosses 88 which likewise have sloping surfaces coplanar with the surface 86. The top portions of the bosses 88 constitute semicircular cutting edges 90. The bottom surface of the stationary cutter 82 is provided with a pair of U-shaped recesses 94 which receive and guide the strips 42. The forward portions of the recesses 94 communicate with a cavity 96 by means of a pair of parallel, vertical, semicircular channels 98. The bosses 88 on the movable cutter 80 are of such size as to precisely interfit the bases of the vertical channels 98 so that the strips are severed as the movable cutter 80 moves upwardly. Since the cutting edges 90 are semicircular, semicircular cuts are made into the strips 42. A wedge so formed is shown in FIGURE 10 and is designated by reference character 100. Note that it has a convex leading or forward end surface 102 and a concave trailing or rearward end surface 104. The purpose of the arcuate end surfaces 102, 104 will later be made apparent.

The movable cutter head 84 is mounted, as by screws 110, on the upper surface of a plate 112 forming the top plate of a yoke 114 which is slidably mounted within a support frame defined by a pair of parallel, vertical posts 116 attached by any suitable means (not shown) to the support bracket 29. The yoke 114 is bifurcated to straddle the ram 64 and is held against the support bracket 29 by means of a pair of guide plates 118 (FIGURE 2). The stationary cutter may be attached, as by screws 120, to the top of the posts 116.

The yoke 114 is reciprocated up and down between the posts 116 by means of a second actuator "B." To this end, an actuating arm 122, which is guided by a pair of guide plates 124, 126 mounted near the top and bottom of the plate 22 respectively, is vertically reciprocated by an actuator "B." A roller 128 mounted near the bottom of the arm 122 is engaged within a slot 130 in a cutter drive lever 132. The lever 132 is pivotally mounted upon a pivot pin 134 extending normally from a stationary plate 136 which is fixedly mounted upon the bracket portion 29b. A second slot 138 is provided within the lever 132 adjacent the pivot pin 134. The slot 138 receives a roller 140 mounted upon the base of the yoke 114. When at rest, the parts occupy the position shown in FIGURE 1, wherein the lever 132 extends substantially horizontally. When the actuator "B" is energized, the arm 122 is elevated, thereby pivoting the lever 132 in a counterclockwise direction, as viewed in FIGURES 1 and 4, to the position shown in FIGURE 4. Accordingly, the roller 140, which is received within the slot 138 is likewise elevated to lift the yoke 114. Of course, since the movable cutter head 84 is mounted upon the top plate 112 of the yoke, the strips 42 are thereby severed. The position of the cutter 80 as it moves from beneath the strips 42 and into the cavity 96 provided in the stationary cutter 82 is indicated by the cutout portions in FIGURES 1 and 4. After the strips 42 have been cut, the actuator "B" returns the arm 122 to its lower or rest position shown in FIGURE 1.

Thus, the first actuator "A" is adapted to actuate the feeding apparatus 44 to feed segments of the wedge strips 42 into the cutter assembly. After each energization of the actuator "A," the second actuator "B" is energized to operate the cutting assembly 46, thereby severing the strips to form a pair of wedges 100. The actuators "A" and "B," which may be hydraulic or pneumatic cylinders, are alternately energized by conventional circuitry. Accordingly, after one pair of wedges 100 is severed from the strips 42, the actuator "A" is energized so as to feed another segment of strips 42 into the cutting assembly and thereby force the pair of wedges previously cut into a pair of wedge retaining apertures 142 (see FIGURE 5) in the magazine 32. As indicated in FIGURE 9, there are as many apertures 142 in the magazine 32 as there are coil-receiving slots in the member 26 and each aperture 142 is colinear with the top of a slot in the stator. The term "top of a slot" refers to the radially innermost portion of a slot, which is above the coils as viewed in FIGURE 11. As shown most clearly in FIGURES 1 and 3, the rearward portion of the head 28 is provided with an annular flange 144 which prevents the wedges 100 from being pushed into the cavity formed between the front face of the magazine and the rear face of the stator. This cavity is designated by reference character 146. The cavity 146 is occupied by a portion of the coils, labelled C, wound on the stator frame. If permitted to enter the cavity 146, the wedges could be damaged by engagement with the uneven contour of the coils, or by a pressure member which also extends into the cavity 146 as will be described below.

While the feed assembly 46 positively and reliably advances the wedge strips 42 toward the cutting assembly and the severed wedges into the magazine aperture, additional means are necessary to guide the wedges 100. Thus, because of the comparatively fragile nature of the wedge material, the wedge strips 42 must be accurately guided into the recesses 94 in the stationary cutter 82. Similarly, the wedges 100 must be guided toward the magazine apertures 142.

The first guide for the wedge strips 42 is located to the rear of the brake 48, and is designated 148 in FIGURES 3 and 5. Then, the clutch and brake jaws themselves serve as guides for the strips 42. Another guide member 150 is placed immediately adjacent the cutter assembly 46. This guide member may be termed a positioning member. It is shown in cross-section in FIGURES 3 and 5 and in perspective in FIGURE 7. The positioning member 150 is generally L-shaped and includes a vertical plate or leg 152 and a horizontal plate or leg 154. The vertical leg 152 is attached to the top plate 112 of the yoke 114 by means of screws 156 which extend through a pair of vertical adjusting slots 158 in the leg 152. The leg 152 also includes a pair of elongate guide slots 160 positioned above the slots 158. The strips 42 are coursed through the slots 160, as shown most clearly in FIGURE 7. The slots 160 must be sufficiently long to permit the positioning member 150 to travel with the cutter head 84 without moving the strips 42. To insure proper horizontal alignment of the guide slots 158 with respect to the cutting assembly, a narrow alignment strip 162 is mounted vertically midway between the slots 158 and positioned within a guide channel (not shown) in the yoke plate 112. The horizontal plate 154 overlies the cutter head 84 and the strips 42, and is provided with a pair of semicylindrical bosses 164 which interfit within the channels 98 in the stationary cutter 82. With this construction, the plate 154 serves to preserve the proper vertical alignment of the strips 42 with respect to the cutting edges 90.

The severed wedges 100 are then guided through the recesses 94 in the bottom of the stationary cutter 82 and into the magazine apertures 142. Since there is a gap between the cutter 82 and the magazine 32, a pair of parallel spring prongs 166 project between the apertures 94 and the magazine 32 to hold the severed wedges in engagement with the side of the support leg 29b adjacent the cutter 82. As best illustrated in FIGURE 8, the prongs 166 are each integral with a spring metal plate 168 attached to the rear face of the cutter 82 by a screw or bolt 170.

The actuator "B" in addition to operating the cutting assembly 46 also provides a drive means for rotatably indexing the magazine 32 with respect to the head 28 about their common axis. For this purpose, a plurality of indexing pins 180 extend into or through the magazine 32 and are circumferentially aligned about the periphery of the magazine. The vertically movable actuating arm 122 supports a pivotal indexing pawl 182. As stated above, the arm 122 is at its lowermost position as shown in FIGURE 1. Upon energization of the cylinder "B," the arm 122 moves upwardly whereby the pawl 182 engages one of the indexing pins 180 to force the magazine 32 to rotate in a counterclockwise direction.

In the specific example disclosed, the mechanism is designed to load wedges into a stator having 36 slots. Since two wedge strips 42 are used, two apertures 142 in the magazine 32 are provided with wedges in a single operation. The magazine 32 must then be rotated by 20° to present a new pair of apertures 142 in position to receive wedges from the cutting assembly. Accordingly, there are 18 indexing pins 180 and the pawl 182 sequentially engages each pin so that as each pin is engaged, it is forced into a position previously occupied by the closest pin located in a counterclockwise direction. The position occupied by the pawl 182 at the termination of its indexing movement is shown in FIGURE 4. Upon the return stroke of the arm 122 to its lowermost or FIGURE 1 position, the pawl 182 is cammed around the next pin to be actuated, that is the pin indicated at 180a in FIGURE 4. Spring means (not shown) return the pin to its FIGURE 1 position after the pawl is cammed about the pin 180a. Clockwise rotation of the magazine 32 is prevented by means of a latching pawl 184 which engages behind the lowermost pin 180b and is spring biased by a spring (not shown) so that it may pivot to the dotted line 184a in FIGURE 4 as the magazine 32 is indexed. When the arm 122 is in its rest position, shown in FIGURE 1, counterclockwise rotation of the magazine is prevented by a locking finger 186 adjustably mounted upon the arm 122. When the arm 122 rises upon energization of the actuator "B," the locking finger 186 also rises to release the magazine 32 for counterclockwise rotation. Thus, the magazine 32 may be accurately indexed by 20° upon each reciprocal movement of the arm 122.

The alternate energization of the actuators "A" and "B" continues throughout the operation of the mechanism. With each energization of the actuators "A" and "B," a pair of wedges 100 are moved into a pair of magazine apertures 142. After one-half of the apertures 142 have been loaded with wedges, and accordingly the magazine 32 has been rotated by 180°, the lowermost pair of apertures 142, as viewed in FIGURE 3, are loaded with wedges. In this lowermost position, the wedges 100 are forced out of the apertures 142 into the slots provided in the stator 26. This is accomplished by means of a pair of elongate, longitudinally extending wedge engaging fingers 190 (FIGURES 3, 5 and 9) which are mounted upon a support block 192 attached to the ram 64. As the ram 64 is moved forwardly, that is to the right as shown in FIGURE 5, the fingers 190 project into the lowermost apertures 142 to force the wedges out of the apertures.

Before the wedges can be forced out of the apertures, however, it is desirable to insure that there is sufficient space in the stator slots to receive the wedges. Some of the coils C may lie in the top of the slots so as to block or hinder entry of wedges into the slots. Thus, to insure sufficient space for entry of the wedges, the coils adjacent the slots must be forced radially outwardly. Also, the wedges leaving the magazine apertures 142 must be accurately guided through the cavity 146 and into the proper stator slots.

To insure space for the wedges within the stator slots and to guide the wedges into the slot, a coil pressure member 200 is slidably confined within the supporting head 28. As shown in FIGURE 5, the pressure member 200 may comprise an inner press plate 202 and an outer press plate 204 separated from the plate 202 by a mounting plate 206. The press plates 202, 204 extend on opposite sides of the stator. The three plates 202, 204 and 206 are sandwiched together by a screw or bolt 208 and held in a fixed relative position by one or more dowel pins 210. A wedge guide member 212 having a pair of guide channels 214, only one of which is shown, extending therethrough is mounted on the base of the inner plate 202. An arcuate blocking flange 216 extends downwardly from the member 212 and forms, with the flange 144, a complete circular flange for blocking the wedges located within the magazine apertures 142. A pair of upright support flanges 218 are mounted on top of the mounting plate 206. The flanges 218 support a cam follower roller 220 therebetween. The ram 64 is provided with a cam surface 222 near its forward end which, as shown in FIGURE 3, engages the cam follower 220 when the ram 64 is at its rearmost or rest position. When the cylinder "A" is energized to drive the ram forwardly, the cam surface 220 drives the pressure member radially outwardly, that is downwardly from the position shown in FIGURE 3 to that shown in FIGURE 5. When in the FIGURE 5 position, the pressure plates 202 and 204 straddle the stator frame and force the adjacent coils radially outwardly. Also, the wedge guide member 212 is so positioned that the channels 214 therein form a path between the lowermost magazine apertures 142 and the stator slots. The guide for the wedges 100 is completed by a pair of downwardly extending flanges 224, best shown in FIGURES 3 and 4, which enter the uppermost or radially innermost portion of the stator slots.

From the above description, it is seen that each time the cylinder "A" is energized to move the ram 64 forwardly, the surface 222 immediately cams the roller 220 and accordingly, the pressure member 200 radially outwardly to likewise force a portion of the coils C radially outwardly. At the same time, a wedge guide path is completed to insure transfer of the lowermost pair of wedges 100 into the top of the lowermost pair of stator slots. Thus, with the pressure member 200 provided by this invention, the wedges may be transferred to the stator slots without damage. The ram must move a considerable distance forwardly before the fingers 190 enter the magazine apertures 142. Because of this lost motion by the fingers 194, the pressure member is first moved radially outwardly to depress the coils and provide the aforementioned guide path.

Upon the return stroke of the ram 64, the roller 220 is free to move upwardly as viewed in the drawings when it again contacts the cam surface 222. The upward movement of the roller 220 and the pressure member 200 may be accomplished by a pair of return springs 226 shown in FIGURE 1. The springs 226 are partially enclosed within borings in the mounting plate 206 and engage stop ledges 228 machined on the supporting head portion 28c.

After the pressure member 200 is returned to its rest or FIGURE 3 position, the cylinder "B" is energized, thereby rotating the magazine 32 and the stator by 20° as described above. Note that rotation of the stator is effectively impossible when the pressure member is in the position shown in FIGURE 5 due to the engagement of the pressure plates 202, 204 with the coil C. Of course, as stated above, after the magazine and stator have been indexed, the transfer operation described above is repeated whereupon another pair of wedges 100 are safely transferred to the stator slots. This process continues until all of the stator slots have been provided with wedges as shown in FIGURE 11. The stator may then be removed, either manually or automatically by suitable apparatus (not shown). Another stator may then be positioned upon the head 28. After the first stator has been loaded with coils, one-half of the magazine apertures 142 remain loaded with wedges 100. Accordingly, upon the first forward stroke of the ram 64, a pair of wedges 100 will be transferred from the magazine 32 to the stator slots. Therefore, the process of providing the second and subsequent stators with wedges will be completed more rapidly than with the first stator.

As already noted, the wedge strips 42 are cut by semi-circular edges 90 and accordingly, the leading edge 102 of each wedge 100 is convex while the trailing edge 104 is concave. The convex leading edge is desirable to aid in guiding the wedges upon entering either the magazine apertures 142 or the stator slots. Since the trailing edge 104 of each wedge is concave, the leading edge of the fingers 190 is formed so as to provide a cooperating convex surface as shown most clearly in FIGURE 9.

In review, the operation of the presently preferred embodiment is as follows. There are five basic operating units; the wedge feed assembly 44, the cutter assembly 46, the magazine rotating means, the coil pressure member 200, and the finger means for inserting the wedges into the stator slots. Two of the five units, namely the cutter assembly 46 and the magazine rotating means are driven and controlled by the actuator "B" through the vertically reciprocal actuating arm 122. Thus, as the arm 122 moves from the FIGURE 1 to the FIGURE 4 position, the magazine 32 and the stator or other field member mounted on the head 28 are rotated through a predetermined angle due to the engagement between the indexing pawl 182 mounted on the arm 122 and one of the indexing pins 180 provided in the magazine 32. Simultaneously, the movable cutter 80 moves upwardly to sever the strands 42 since the yoke 114 upon which the cutter 80 is mounted is operably connected to the arms 122 by the cutter drive lever 132. The actuator "B" then returns the arm 122 to its lowermost or FIGURE 1 position wherein the magazine is accurately locked by the latching pawl 184 and the locking finger 186.

The remaining units are driven and controlled by the actuator "A" through the horizontally reciprocal ram 64. Thus, the drive for the feed assembly 44 is provided by the clutches 50 which are connected to the ram 64 through the support block 62. The pressure member 200, which presses radially outwardly against the coils adjacent the pair of stator slots to be provided with wedges is driven by the cam surface 222 provided near the front of the ram 64. Finally, the fingers 190 which transfer the wedges 100 from the magazine aperture 142 to the stator slots are connected to the ram 64 through the support block 192. Upon initial movement of the ram 64 forwardly, the cam surface 222 forces the pressure member 200 radially outwardly, that is downwardly as viewed in FIGURES 3 and 5. Thereafter, continued forward movement of the ram 64 causes the strips 42 to be moved forwardly to the cutter 46. Also, the wedges 100 previously severed from the strips 42 are advanced into the uppermost pair of magazine apertures 142. Simultaneously, the wedges located in the lowermost pair of magazine apertures 142 are transferred to the lowermost pair of stator slots.

The actuators "A" and "B" are alternately energized. Thus, after wedges are forced into one pair of stator slots, an empty pair of slots is indexed into position to receive wedges. This process is continued until all of the slots are loaded with wedges.

In the example illustrated, the pair of magazine apertures 142 which are being loaded with wedges are diametrically opposed to the apertures which are being unloaded. Of course, the feed apparatus 44 and the fingers 190 could be so positioned that the angle between the apertures being loaded and unloaded is less or greater than 180°.

The circuitry for controlling the alternate energization of the actuators "A" and "B" may be of any suitable character. Since there are numerous types of conventional control circuits suitable to practice the invention, it is believed unnecessary to encumber this specification with the details of such a circuit. The circuit chosen may be housed in a frame 230 mounted on an unused portion of the plate 22.

An example of a stator which has been provided with wedges 100 is shown in FIGURE 11. The stator frame, designated 240 has been wound with coils C which are deposited in the stator slots, designated 242. Each slot is lined with a U-shaped insulating element 244. The wedges 100 cooperate with the elements 244 to completely insulate the coils from the walls of the slots 242.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Apparatus for inserting wedges into the coil-receiving slots in a field member comprising in combination: a field member support; a wedge magazine having a plurality of wedge retaining apertures therein mounted adjacent said support, supply means intermittently operable to load at least one aperture in said magazine with a wedge upon each operation thereof; drive means producing intermittent relative rotation between the magazine and the supply means; means alternately actuating said supply means and said drive means whereby successive magazine apertures are loaded with wedges; and means spaced from said supply means for transferring wedges from the magazine to a field member mounted on said support.

2. The combination according to claim 1 in which said support is cylindrical; means being provided to retain a field member to be provided with wedges in engagement with said magazine, and in which said drive means is operatively coupled with said magazine to intermittently rotate said cartridge and the field member about said support.

3. Apparatus for inserting wedges into the top of coil-receiving slots in a ring shaped field member comprising: a fixed cylindrical supporting head; a rotatable wedge magazine mounted upon said head, said magazine having a plurality of apertures spaced about the periphery of said head; an annular flange integral with said magazine surrounding and in spaced relation to said head; means clamping a field member on said head with one face in engagement with said flange and with its slots aligned with the apertures in the magizine; means interconnecting said flange and said field member whereby said field member rotates about said head upon rotation of said magazine; means to supply wedges to the apertures in said magazine; transfer means operable to move wedges from said magazine to slots in the field member, and indexing means to rotate the magazine and field member by increments after at least one slot has been provided with a wedge.

4. The apparatus of claim 3 in which said means to supply wedges includes a cutting assembly and a wedge strip feed assembly, said feed assembly being intermittently operable to supply lengths of strip material to said cutting assembly whereupon the strip material is cut into wedges and to force the cut wedges from said cutting assembly into the magazine apertures.

5. The apparatus of claim 4 further comprising a pair of alternately energized actuators, one of said actuators being operably connected to said transfer means and said feed assembly to simultaneously supply said cutting assembly with the strip material and transfer at least one wedge from said magazine to the field member, the other of said actuators being operably connected to said cutting assembly and said indexing means to simultaneously cut this strip material into wedges and rotate said magazine.

6. A mechanism for inserting wedges into inwardly directed slots provided in an annular field member in which field carrying coils have been deposited, comprising: a ram; means for reciprocating said ram along a linear path; a field member supporting head; a magazine provided with a plurality of apertures rotatably mounted upon said head; means for retaining a field member on said head in abutment with said magazine with the slots provided in the field member aligned with the apertures in said magazine; a cutting assembly mounted adjacent said magazine; an actuating arm; means operably connecting said arm and said cutting assembly; supply means mounted upon said ram for supplying a strip of wedge material to said cutting assembly; said actuating arm being actuable to operate said cutter to cut said strip into wedges and said ram being actuable to supply the strip to said cutting assembly and wedges cut from said strip to the apertures in said magazine; an inserting finger mounted upon said ram; said finger being adapted to enter one of said magazine apertures and push a wedge located therein into one of the slots in the field member; pressure means adapted to depress coils adjacent a slot to be provided with a wedge; means interconnecting said pressure means and said ram whereupon initial movement of said ram actuates said pressure means and continued movement of said ram causes said fingers to enter said last mentioned aperture; and indexing means connected to said arm for indexing said magazine upon removal of said pressure means and said finger to present a different aperture in alignment with said cutting assembly and also a different aperture in alignment with said finger.

7. A mechanism for inserting wedges into inwardly directed slots provided in an annular field member in which field carrying coils have been deposited, comprising: a field member supporting head; a magazine rotatably mounted upon said head, said magazine being provided with a plurality of apertures extending longitudinally therethrough; means for retaining a field member upon said head in abutting engagement with a portion of said magazine; pressure means mounted within said head and movable to depress coils extending adjacent a pair of slots in said field member; a cutting assembly mounted rearwardly of said head and said magazine; a ram mounted for movement along the axis of said head and said magazine; supply means mounted upon said ram for supplying a pair of strips to said cutting assembly; a pair of fingers mounted upon said ram adapted to enter a pair of apertures in said magazine and force wedges from said apertures into a pair of slots in said field member; means interconnecting said ram and said pressure means such that upon initial movement of said ram, the pressure means depresses a portion of the coils adjacent the slots to be provided with wedges and upon continued movement of said ram a pair of wedges are forced by said fingers into said last mentioned slots.

8. In a mechanism for inserting wedges into the top of inwardly directed coil-receiving slots of a ring shaped field member, in which coils are deposited, the combination comprising: a cylindrical field member supporting head; means retaining a field member on said supporting head; a wedge magazine mounted on said supporting head, said magazine having a plurality of wedge retaining apertures aligned with the slots in the field member; a radially movable pressure member slidably mounted within said supporting head; a ram; cam means interconnecting said pressure member and said ram whereby movement of said ram in one direction causes said pressure member to move radially outwardly thereby moving a portion of the coils away from the slots to be provided with wedges; finger means adapted to enter the magazine apertures to force the wedges therein into the field member slots, said finger means being attached to said ram; and guide means attached to the outermost surface of said pressure member for guiding the wedges from said magazine to the stator slots.

9. The combination of claim 8, in which said pressure member comprises a pair of press plates adapted to engage the coils on opposite sides of the field member, and a mounting plate separating and attached to said press plates, said mounting plate having at least one flange thereon which enters the top of a coil-receiving slot to guide the wedge within the slot.

References Cited in the file of this patent

UNITED STATES PATENTS

| | | |
|---|---|---|
| 2,340,291 | Wirtz | Feb. 1, 1944 |
| 2,619,716 | Swift | Dec. 2, 1952 |
| 2,808,640 | Biddison | Oct. 8, 1957 |